US012022591B1

(12) United States Patent
Jackson et al.

(10) Patent No.: US 12,022,591 B1
(45) Date of Patent: Jun. 25, 2024

(54) LAMP ASSEMBLIES AND METHODS FOR CONTROLLING OPERATING PARAMETERS OF LIGHT SOURCES

(71) Applicant: DIODE DYNAMICS, L.L.C., St. Charles, MO (US)

(72) Inventors: Cole Jackson, Cheshire, CT (US); Paul Jerome McCain, St. Charles, MO (US); Trevor Dobbins, St. Charles, MO (US)

(73) Assignee: DIODE DYNAMICS, LLC, St. Charles, MO (US)

(*) Notice: Subject to any disclaimer, the term of this patent is extended or adjusted under 35 U.S.C. 154(b) by 168 days.

(21) Appl. No.: 17/837,933

(22) Filed: Jun. 10, 2022

(51) Int. Cl.

| | |
|---|---|
| ***H05B 47/165*** | (2020.01) |
| ***H05B 45/00*** | (2022.01) |
| ***H05B 47/105*** | (2020.01) |
| ***H05B 47/16*** | (2020.01) |
| ***H05B 47/17*** | (2020.01) |

(52) U.S. Cl.
CPC ........... *H05B 47/165* (2020.01); *H05B 45/00* (2020.01); *H05B 47/105* (2020.01); *H05B 47/16* (2020.01); *H05B 47/17* (2020.01)

(58) Field of Classification Search
CPC .... H05B 47/165; H05B 47/105; H05B 47/16; H05B 47/17; H05B 45/00
See application file for complete search history.

(56) References Cited

U.S. PATENT DOCUMENTS

| | | | | |
|---|---|---|---|---|
| 8,796,930 B2 * | 8/2014 | Adams | H05B 45/325 315/80 |
| 11,006,503 B2 * | 5/2021 | Bertken | H05B 47/115 |
| 2020/0187331 A1 * | 6/2020 | Bertken | H05B 45/37 |
| 2021/0254800 A1 * | 8/2021 | Bertken | H05B 47/11 |
| 2021/0329767 A1 * | 10/2021 | Van Der Ham | H05B 47/16 |
| 2023/0128343 A1 * | 4/2023 | Bardio | H05B 47/185 315/152 |

* cited by examiner

*Primary Examiner* — Raymond R Chai
(74) *Attorney, Agent, or Firm* — Harness, Dickey & Pierce, P.L.C.

(57) ABSTRACT

Lamp assemblies and methods are provided for controlling one or more operating parameters of at least one controllable light source. One example lamp assembly includes at least one controllable light source and a controller coupled to the at least one controllable light source. The controller is configured to control an operating parameter of the at least one controllable light source. The controller includes a storage medium configured to store a programming variable and an operating variable. The controller, in response to receiving primary power from a power source during a power cycle, is configured to determine whether the controller is in a programming mode based on a value of the programming variable, and in response to determining the controller is in the programming mode, modify a value of the operating variable.

19 Claims, 2 Drawing Sheets

LAMP ASSEMBLIES AND METHODS FOR CONTROLLING OPERATING PARAMETERS OF LIGHT SOURCES

FIELD

The present disclosure generally relates to lamp assemblies including controllers and controllable light sources, and to related control methods for controlling one or more operating parameters of light sources.

BACKGROUND

This section provides background information related to the present disclosure which is not necessarily prior art.

Vehicles are known to include factory lighting components installed by original equipment manufacturers. The factory lighting components are controlled through on-board computers. In some modern vehicles, users may set operating parameters of the factory lighting components through dashboard interfaces in the vehicles. For example, users may select an accent color or an illumination time period for factory lighting components in vehicles.

Vehicles are also known to include aftermarket lighting components such as a lamp assembly installed by users after the purchase of the vehicles. The aftermarket lamp assembly receives power from a power source such as an alternator or battery via an existing electrical circuit (power and ground conductors) in the vehicles. Additionally, the aftermarket lamp assembly may include a microcontroller that allows users to modify a configuration value in the microcontroller and set an operating parameter of the assembly using the existing electrical circuit. Configuration of the microcontroller is set by manipulating a switching device at the assembly or a switching device in a cab of the vehicle routed to the assembly. Because the microcontroller must remain powered during configuration, a passive electrical component such as a capacitor is employed as a secondary power source to provide temporary or secondary power to the microcontroller via the electrical circuit after power from the battery is removed. As such, the microcontroller remains powered for a period of time after primary power to the microcontroller is removed to allow a user to set a desired operating parameter of the assembly. This approach is provided in U.S. Pat. No. 8,796,930 to Adams et al.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
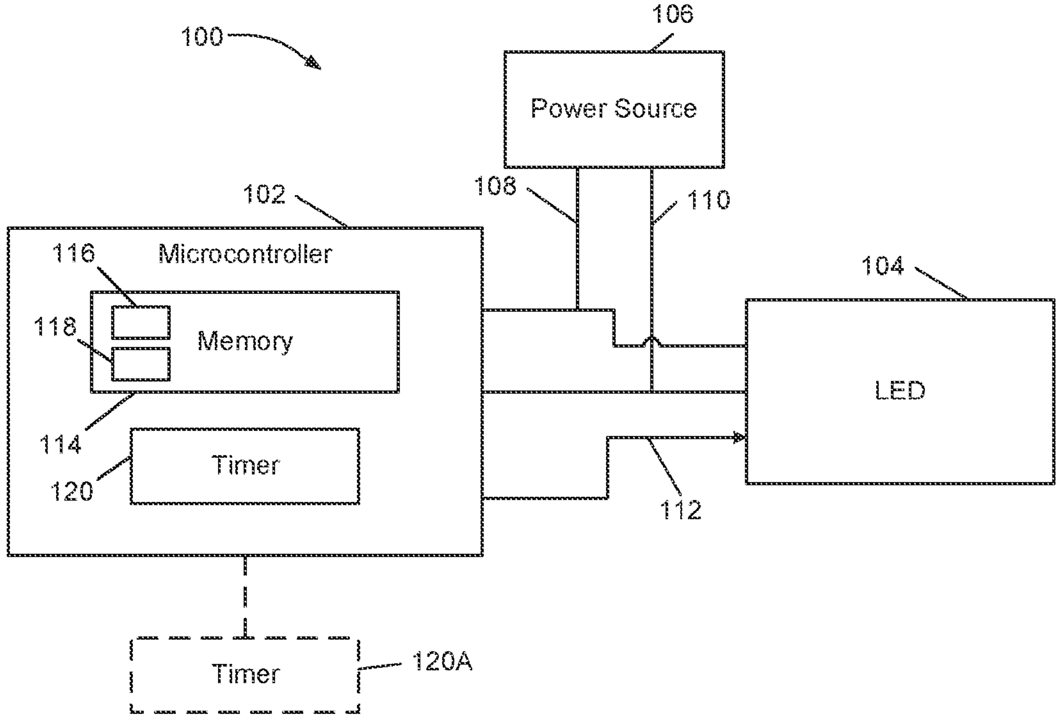
FIG. 1 is a block diagram of an example lamp assembly of the present disclosure, where the lamp assembly includes an LED and a controller suitable for controlling one or more operating parameters of the LED.

Example embodiments will now be described more fully with reference to the accompanying drawings. The description and specific examples included herein are intended for purposes of illustration only and are not intended to limit the scope of the present disclosure.

A lamp assembly is designed to receive power from a power source via an electrical circuit (power and ground conductors) and to have various configurable operating parameters. A particular operation parameter of the lamp assembly may be set through the same power and ground conductors that provide power to the assembly. For example, the lamp assembly may include a microcontroller that allows users to modify a stored configuration value and set a desired operating mode of the assembly via the power and ground conductors. Conventionally, configuration of the microcontroller is done with the use of a capacitor or another passive electrical component when the power source is removed or via a switching device at the assembly or in a cab of the vehicle. The use of a capacitor or another passive electrical component to provide necessary power to configure the microcontroller may be undesirable. For example, the microcontroller may be misconfigured when a capacitor is relied on to provide temporary power during configuration of the microcontroller. The microcontroller may be misconfigured when, for example, the capacitor discharges before configuration of the microcontroller is complete, the power source is reconnected while the capacitor is discharging and before configuration of the microcontroller is complete, etc. Additionally, a capacitor for providing temporary power during configuration of the microcontroller may be large and costly.

Uniquely, the lamp assemblies and methods herein enable a controller (e.g., a microcontroller, etc.) to be in a programming mode and to modify one or more operating parameters of controllable light sources (e.g., LEDs, laser diodes, etc.) while receiving primary power from a power source. In particular, the controller may be configured, while receiving primary power from a power source in a vehicle, to determine whether it is in a programming mode based on a variable and to modify operation of the lamp assembly through another variable when the controller is in the programming mode. In some embodiments, controls (e.g., existing factory controls, user-installed controls, etc.) in the vehicle may be used by a user to cycle power from the power source to the controller. In this manner, the controller may be configured to modify a variable when the controller is in the programming mode for each power cycle of the power source. Because the operating parameter is modified while the controller receives primary power (and not temporary or secondary power), supplemental components such as capacitors (or other passive electrical components) are not required to provide power to the controller to modify the operating parameter. As such, the lamp assemblies and methods herein provide for a cost-effective solution for modifying operating parameters through the use of factory and/or user-installed controls while receiving primary power from a power source.

FIG. 1 illustrates an example lamp assembly 100 in which one or more aspects of the present disclosure may be implemented. Although the lamp assembly 100 is presented in one arrangement, other embodiments may include lamp assemblies arranged otherwise depending on, for example, the number and/or types and/or configurations of controllable light sources employed in connection therewith.

In the illustrated embodiment, the lamp assembly 100 generally includes a controller 102 and an LED 104 coupled to the controller 102. As shown in FIG. 1, the controller 102 and the LED 104 are configured to receive power from a power source 106 via a power conductor 108 and a ground conductor 110. Additionally, the controller 102 is configured to generate and output one or more control signals 112 (e.g., one or more PWM signals, etc.) to the LED 104, thereby controlling an operating parameter of the LED 104. Although the lamp assembly 100 is shown with one controller 102, one control signal 112, and one LED 104 in FIG. 1, it should be appreciated that more than one controller, more than one control signal, and/or more than one LED may be employed. For example, the lamp assembly 100 may include multiple LEDs arranged in one or more LED arrays such as multi-die LED arrays, and the controller 102 may generate and output two control signals, four control signals, etc., depending on, for example, the number of LEDs present in the assembly 100 and/or the number of controllable LED operating parameters available.

Although the lamp assembly 100 of FIG. 1 is illustrated and described as including the LED 104, it should be appreciated that another suitable type of controllable light source may be employed in the lamp assembly 100 and/or any other lamp assembly disclosed herein. For example, the lamp assembly 100 and/or any other lamp assembly disclosed herein may include one or more laser diodes and/or other suitable controllable light sources. In such examples, the laser diodes and/or other suitable light sources may include similar controllable operating parameters as explained herein. Further, the lamp assembly 100 and/or any other lamp assembly disclosed herein may be referred to as a LED assembly when one or more LEDs are employed, a laser light assembly when one or more laser diodes are employed, etc.

In the illustrated embodiment of FIG. 1, the controller 102 may include any suitable processing device. For example, the controller 102 may include, without limitation, a general purpose processor unit (CPU), a microcontroller, a reduced instruction set computer (RISC) processor, an application specific integrated circuit (ASIC), a programmable logic circuit (PLC), a programmable gate array (PGA), discrete circuitry, and/or any other circuit or processor capable of executing the functions described herein. The methods disclosed herein may be encoded as firmware into the controller 102 and/or executable instructions embodied in computer-readable media, contained within the controller 102, and/or separate from the controller 102 in one or more associated memory devices. In the illustrated embodiment of FIG. 1, the controller 102 includes a microcontroller. Although the lamp assembly 100 is shown with a microcontroller, it should be appreciated that the lamp assembly 100 may include another suitable type of processing device capable of executing the functions described herein.

The power source 106 may be any suitable source for providing power to the controller 102 and the LED 104. For example, the power source 106 may be considered a primary power source which is configured to provide primary power to the controller 102 and the LED 104 during normal operations of the controller 102 and the LED 104. Additionally, and as further explained herein, the power source 106 also provides power to the controller 102 and the LED 104 during programming operations of the controller 102. In some embodiments, the power source 106 may be a factory power source in a vehicle such as an existing alternator and/or battery. In such embodiments, the power conductor 108 and the ground conductor 110 may be part of an existing power circuit in the vehicle.

The LED 104 may be employed in any suitable system as one or more light sources. For example, the LED 104 may be a light source in a vehicle, etc. More specifically, the LED 104 may be a headlight, a turn signal, a light bar, a taillight, a dome light, a fog lamp, a decorative light, a cargo lamp, a puddle lamp, a mirror lamp, an auxiliary lamp, and/or another suitable exterior and/or interior vehicle light source.

With continued reference to FIG. 1, the LED 104 includes one or more operating parameters which are controllable by the controller 102. The operating parameters represent output characteristics of the LED 104. For example, the controllable operating parameters may include a color of the LED 104, light intensity (e.g., brightness, etc.), strobe modes, a beam pattern (e.g., directionality, etc.), an adaptive directionality (e.g., cornering or steering controls, etc.), light activation (e.g., when a light will activate, which emitters of a plurality of LEDs will activate, etc.), etc.

As shown in FIG. 1, the controller 102 includes a memory 114 and a timer 120. The memory 114 is configured to store a programming variable 116 and an operating variable 118. The memory 114 may be any suitable storage medium configured to store data, computer executable instructions, etc. For example, the memory 114 may include, without limitation, RAM, ROM (e.g., EEPROM, etc.), etc. Although the controller 102 is shown as including the memory 114 and the timer 120, it should be appreciated that the memory 114 and/or the timer 120 may be a separate component and positioned external to the controller 102. For example, the lamp assembly 100 may include an additional or alternative timer 120A (shown in dashed lines) in communication with the controller 102.

The controller 102 is configured to control one or more operating parameters of the LED 104 based on power from the power source 106. For example, power provided by the power source 106 to the controller 102 may be removed as desired. As such, a power cycle may be created each time the controller 102 is powered (power is received from the power source 106) and not powered (power is removed to the controller 102). In some embodiments, the removal of power to the controller 102 may be controlled by a user. For example, the user may manipulate (e.g., select, move, etc.) a control (e.g., a head lamp switch, an auxiliary switch, etc.) that may be configured to supply power (e.g., directly, etc.) as the power source 106, to control a switching device coupled between the power source 106 and the controller 102, etc. In such embodiments, power at the controller 102 may be removed (e.g., interrupted, etc.) each time the user manipulates the control. The control may include, for example, a factory control and/or a user-installed control. The control may be, for example, an input on a control screen, a moveable lever, a button, a switch, or another factory and/or user installed input device.

To initiate a change in an operating parameter of the LED 104, the controller 102 receives power from the power source 106. When the controller 102 is powered, the controller 102 is configured to immediately modify a value of the programming variable 116 stored in the memory 114 and activate the timer 120. The controller 102 may be configured to modify a value of the programming variable 116 in any suitable manner. For example, the controller 102 may be configured to increment a numerical value (e.g., 0 to 1, 3 to 6, etc.) of the programming variable 116, decrement a numerical value (e.g., 3 to 2, 9 to 6, etc.) of the programming variable 116, change an alphabetical value (e.g., A to D, Z to B, etc.) of the programming variable 116, etc.

In some embodiments, the controller 102 may be configured to modify a value of the programming variable 116 and activate the timer 120 each power cycle in which the controller 102 receives power from the power source 106. As such, the controller 102 may be configured to modify a value of the programming variable 116 each time it receives power from the power source 106 and/or reset or maintain the value of the programming variable 116 based on the timer 120. In some embodiments, the controller 102 may be configured to modify a value of the programming variable 116 for each power cycle until the value of the programming variable 116 reaches a defined value. Once the value of the programming variable 116 reaches the defined value, the controller 102 may be configured to maintain the value of the programming variable 116 at its current value until the value is reset.

The controller 102 may be configured to be in a programming mode based on a value of the programming variable 116 stored in the memory 114. In some embodiments, the controller 102 may be in the programming mode when the value of the programming variable 116 is equal to a defined value. For example, the controller 102 may be configured to compare the value of the programming variable 116 and a defined value. The defined value may be any suitable value such as 2, 3, 4, D, Z, etc.

Once in the programming mode, the controller 102 is configured to modify a value of the operating variable 118 stored in the memory 114 and activate the timer 120. The controller 102 may be configured to modify a value of the operating variable 118 in any suitable manner. For example, the controller 102 may be configured to increment a numerical value (e.g., 0 to 1, 3 to 6, etc.), decrement a numerical value (e.g., 3 to 2, 9 to 6, etc.), change an alphabetical value (e.g., A to D, Z to B, etc.), etc.

With continued reference to FIG. 1, the controller 102 may be configured to modify a value of the operating variable 118 in the same power cycle as determining that it is in the programming mode. For example, once in the programming mode, the controller 102 may be configured to modify (e.g., increment, etc.) a value of the operating variable 118 before power is removed (e.g., within the same power cycle, etc.). The controller 102 may be configured to modify the operating variable 118 again during one or more subsequent power cycles if the stored programming variable 116 remains equal to the defined value (e.g., the controller 102 remains in its programming mode, etc.).

Further, the controller 102 may be configured to perform different functions with respect to the variables 116, 118 in response to receiving power for more or less than a defined period of time (e.g., 0.25 seconds, 0.5 seconds, 1 second, 1.5 seconds, two seconds, 5 seconds, etc.) as established by the timer 120. In some embodiments, the controller 102 may be configured to reset the value of the programming variable 116 to the default value (e.g., 0, A, etc.) and/or maintain the value of the operating variable 118 at its current value in response to receiving power for more than the defined period of time during a power cycle. As a result of resetting the programming variable 116, the controller 102 may no longer be in the programming mode (e.g., on the next power cycle, etc.) because the value of the programming variable 116 no longer equals the defined value. In other embodiments, the controller 102 may be configured to maintain the values of the operating variable 118 and the programming variable 116 at their current values in response to receiving power for less than the defined period of time. In other words, the controller 102 may be configured to maintain the stored values if power from the power source 106 to the controller 102 is removed (e.g., lost, etc.) within the defined period of time during a power cycle.

The controller 102 is then configured to control one or more operating parameters of the LED 104 based on the value of the operating variable 118. For example, the controller 102 is configured to generate and output the control signal 112 to the LED 104 consistent with the current value of the operating variable 118. As such, one or more parameters of the control signal 112 may change as the value of the operating variable 118 is modified. In some embodiments where the control signal 112 is a PWM signal, the controller 102 may be configured to change a pulse width, a duty cycle, etc., based on the current value of the operating variable 118. As a result, an operating parameter of the LED 104 may be adjusted based on the changing control signal 112 (as configured by the controller 102).

In some embodiments, each value of the operating variable 118 may correspond to a different state of the operating parameter of the LED 104. In such embodiments, a sequence of defined operating variable values may correspond to different states of the operating parameter of the LED 104. For example, a first value (e.g., 1, A, etc.) of the operating variable 118 may correspond to a first state (e.g., a first color, a first level of intensity, etc.) of the operating parameter of the LED 104 and a second value (e.g., 2, B, etc.) of the operating variable 118 may correspond to a second state (e.g., a second color, a second level of intensity, etc.) of the operating parameter of the LED 104. As such, if the operating parameter is associated with the color provided by the LED 104, the first value of the operating variable 118 corresponds to the color blue, and the second value of the operating variable 118 corresponds to the color red, the controller 102 may be configured to initially generate and output the control signal 112 to the LED 104 consistent with the first value, thereby adjusting the color of the LED 104 to blue. If the operating variable 118 is modified to the second value (as configured by the controller 102), the controller 102 may be configured to generate and output the control signal 112 to the LED 104 consistent with the second value, thereby adjusting the color of the LED 104 to red.

With continued reference to FIG. 1, the controller 102 may include a failsafe scheme that is triggered, for example, based on a value of the operating variable and/or a value of the programming variable. For example, the controller 102 may be configured to reset the operating variable to a default value if the value of the operating variable is modified (e.g., incriminated, etc.) a defined number of times consecutively. In such embodiments, the LED 104 (and other LEDs controlled by the controller 102) may be configured to return to a default operating state. Once the controller 102 receives power again (e.g., on the next power cycle, etc.), the controller 102 may be configured to modify values of the programming variable and/or the operating variable, thereby adjusting the operating parameter of the LED 104.

Figure 2:
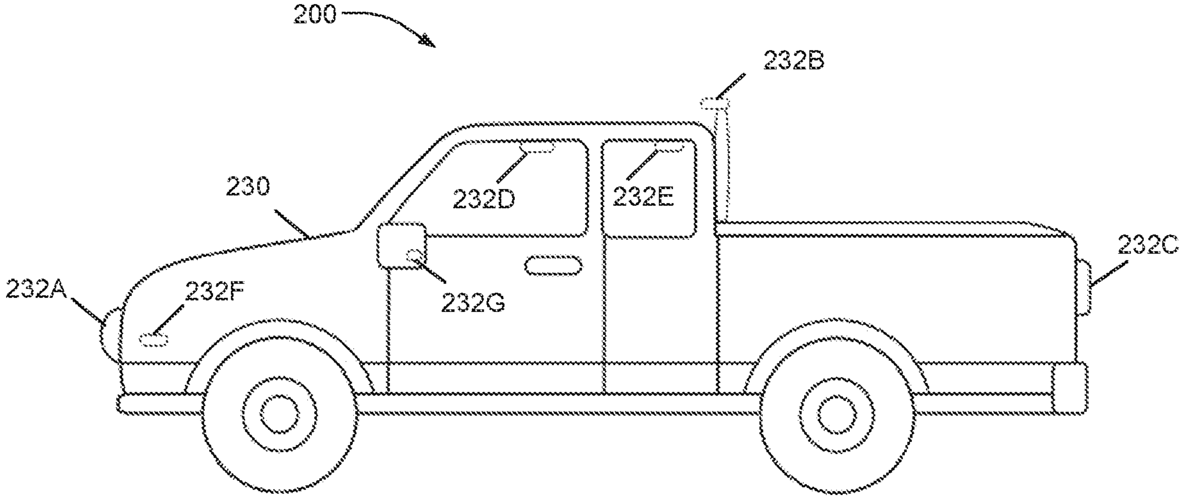
FIG. 2 is a diagram of an example system of the present disclosure, where the system includes a vehicle and multiple lamp assemblies.

FIG. 2 illustrates an example system 200 in which one or more aspects of the present disclosure may be implemented. As shown in FIG. 2, the system 200 includes a vehicle 230 and multiple lighting components 232A, 232B, 232C, 232D, 232E, 232F, 232G coupled to the vehicle 230. In the system 200, the lighting components 232A, 232B, 232C, 232D, 232E, 232F, 232G represent a headlight, a light bar, a taillight, a front interior dome light, a rear interior dome light, a parking light, a sideview light, respectively, powered by a power source (e.g., the power source 106 of FIG. 1, etc.). In some embodiments, the power source 106 may be an existing alternator or battery (not shown) in the vehicle 230. Although the system 200 is presented in one arrangement, other embodiments may include lighting components arranged otherwise depending on, for example, vehicle design. Additionally, although the system 200 is shown in FIG. 2 as including a truck, it should be appreciated that the system 200 may include another type of consumer vehicle such as a car, a van, an ATV, a motorcycle, a watercraft, etc.

In the illustrated embodiment of FIG. 2, one or more of the lighting components 232A-E may be implemented with the lamp assembly 100 of FIG. 1 configured to receive power from, for example, the existing alternator or battery in the vehicle 230. For example, the lighting component 232A may include the controller 102 and the LED 104 of FIG. 1, the lighting component 232B may include the controller 102 and the LED 104 of FIG. 1, and so on. In such embodiments, the LED 104 (or an array of LEDs) in each lighting component 232A-E may be individually controlled as explained above. In other embodiments, two or more of the lighting components 232A-E may be implemented with the lamp assembly 100 of FIG. 1. For example, the lighting component 232D may include the LED 104 (or an array of LEDs) and the lighting component 232E may include another LED 104 (or another array of LEDs). In such embodiments, the controller 102 of FIG. 1 may control both LEDs (or arrays of LEDs) in the lighting components 232D, 232E separately or in conjunction. This may be particularly beneficial if the lighting components 232D, 232E are coupled in parallel with the same power and ground conductors (e.g., the power conductor 108 and the ground conductor 110 of FIG. 1, etc.).

Figure 3:
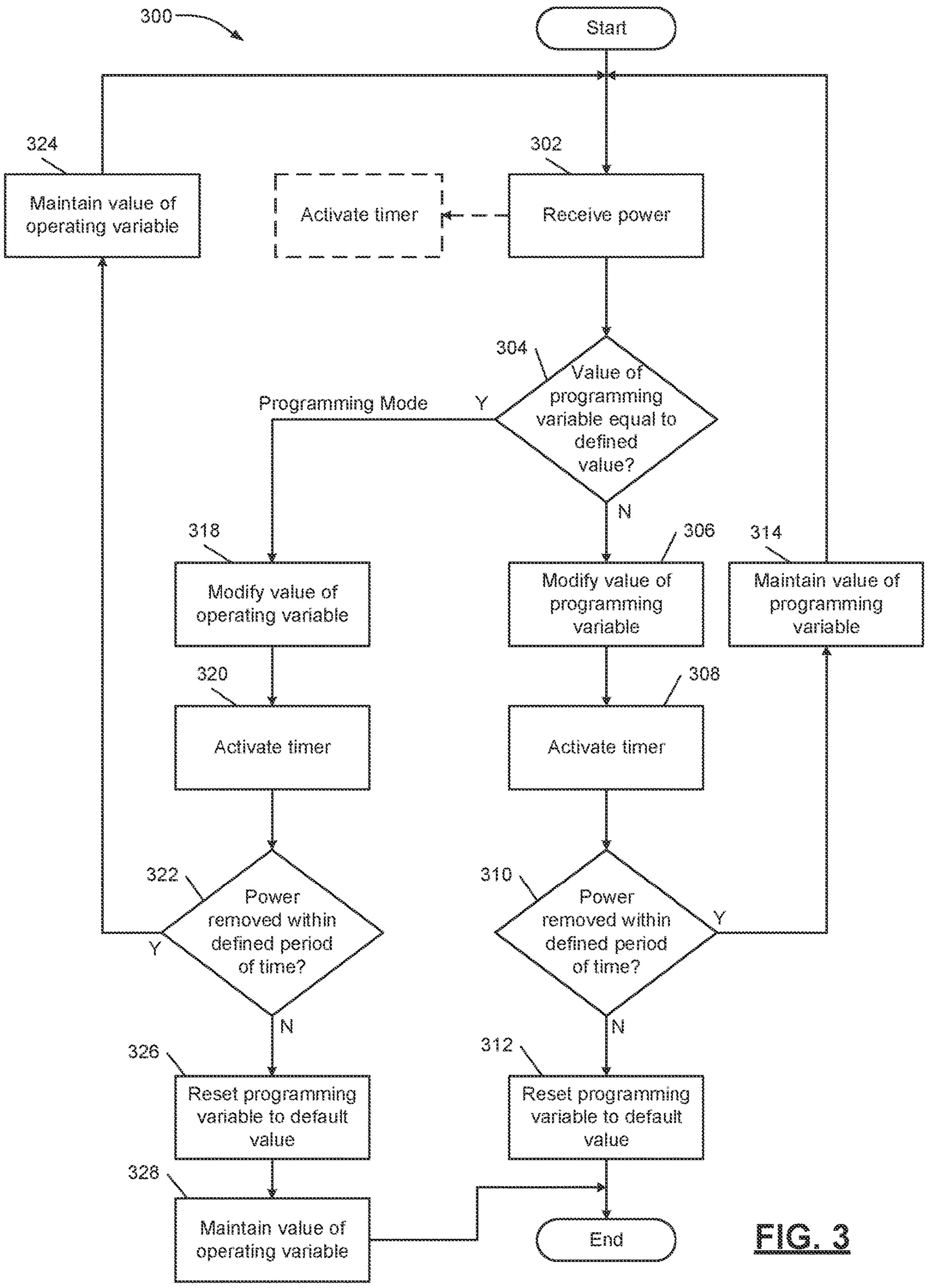
FIG. 3 is a flow diagram of an example control method that may be implemented in connection with the lamp assembly of FIG. 1.

FIG. 3 illustrates an example method 300 for use in controlling one or more operating parameters of at least one LED in a lamp assembly. The example method 300 is described with reference to the lamp assembly 100 of FIG. 1. However, it should be understood that the method 300 is not limited to the lamp assembly 100, as the method 300, for example, may be implemented, at least in part, in another suitable lamp assembly. Likewise, the lamp assemblies herein including the lamp assembly 100 should not be understood to be limited to the example method 300.

In the example method 300, control of the one or more operating parameters of the LED 104 is based on power being received by the controller 102 and then subsequently removed. The removal of power to the controller 102 may be controlled by a user through, for example, a control (e.g., a factor control, a user-installed control, etc.) as explained above. As further explained below, the controller 102 performs the functions herein for modifying an LED operating parameter (e.g., modifying a programming variable, modifying an operating variable, etc.) while receiving power from the same power source 106 over one or more power cycles.

The method 300 of FIG. 3 begins when the controller 102 receives power from the power source 106 at 302. Next, at 304, the controller 102 determines if the currently stored value of the programming variable 116 is equal to a defined value (e.g., 2, 3, etc.). The current value of the programming variable 116 may be a default value (e.g., 0, A, etc.) or another value. If the stored value of the programming variable 116 is not equal to the defined value at 304, the controller 102 modifies the value of the programming variable 116 at 306 and activates (e.g., starts, etc.) the timer 120 at 308. For example, the controller 102 may increment the value of the programming variable 116 (e.g., from 0 to 1, etc.) when the current value of the programming variable 116 is not equal to the defined value.

Next, at 310, the controller 102 determines if power from the power source 106 has been removed within a defined period of time. For example, upon activation, the timer 120 may initiate a clock that counts from zero to the defined period of time (e.g., 0.25 seconds, 0.5 seconds, 1 second, 1.5 seconds, two seconds, 5 seconds, etc.). If power is not removed from the controller 102 within the defined period of time, the controller 102 proceeds to reset the programming variable 116 to its default value (e.g., 0, etc.) at 312.

If, however, power is removed from the controller 102 within the defined period of time (e.g., power is removed before the timer 120 reaches the defined period of time, etc.), the controller 102 maintains the programming variable 116 at the modified value at 314. Once the controller 102 receives power again (e.g., during a subsequent power cycle, etc.) at 302, the controller 102 activates the timer 120 again at 308 and modifies the value of the programming variable 116 again at 306 if the stored value of the programming variable 116 is not equal to the defined value at 304.

If the stored value of the programming variable 116 is equal to the defined value at 304 during the initial power cycle or a subsequent power cycle, the controller 102 is in a programming mode. For example, in some embodiments, the defined value may be three and the programming variable 116 may be set to a default value of zero. In such embodiments, the controller 102 may increment (or otherwise modify) the programming variable 116 at 306 from 0 to 1, then from 1 to 2, and then again from 2 to 3 during three power cycles if power is removed within the defined period of time in each power cycle. On the next power cycle when the controller 102 receives power and the value of the programming variable 116 is three, the controller 102 is in the programming mode.

Once in the programming mode, the controller 102 modifies the value of the operating variable 118 at 318 and activates the timer 120 at 320. For example, the controller 102 may be configured to increment the value of the operating variable 118 (e.g., from 0 to 1, etc.). Although the illustrated embodiment of FIG. 3 includes activating the timer 120 after the value of the programming variable and after the value of the operating variable are modified at 306, 318, it should be appreciated that the timer 120 may be activated in response to the controller 102 receiving power at 302 as shown in the dashed box.

Next, at 322, the controller 102 determines if power from the power source 106 has been removed within the defined period of time established by the timer 120 as explained above. If power is removed from the controller 102 within the defined period of time (e.g., power is removed before the timer 120 reaches the defined period of time, etc.), the controller 102 maintains the operating variable at its current value at 324. Once the controller 102 receives power again (e.g., during one or more subsequent power cycles, etc.) at 302, the controller 102 activates the timer 120 again and modifies the value of the operating variable 118 again at 318 if the stored value of the programming variable 116 is equal to the defined value at 304.

If, however, power is not removed from the controller 102 within the defined period of time (e.g., the timer 120 reaches the defined period of time, etc.), the controller 102 resets the programming variable 116 to its default value (e.g., from 3 to 0, etc.) at 326 and maintains the operating variable 118 at its current value at 328. At this point, the controller 102 may output the control signal 112 to the LED 104 consistent with the current value of the operating variable 118 during the current power cycle or a subsequent power cycle, thereby adjusting the operating parameter of the LED 104 as explained above.

Additionally, once the programming variable 116 is reset to its default value (e.g., 0, etc.), the controller 102 is no longer in the programming mode on the next power cycle. For example, once the controller 102 receives power again (e.g., during a subsequent power cycle, etc.) at 302, the controller 102 determines that the current value of the programming variable 116 is not equal to the defined value. As such, the controller 102 is not in the programming mode on the next power cycle. If the user desires to adjust the operating parameter of the LED 104 again, power can be provided to and removed from the controller 102 over one or more power cycles to modify the programming variable 116 at 306 as explained above. Once the value of the programming variable 116 again equals the defined value at 304, the controller 102 is in the programming mode again and modifies the operating variable 118 at 318 as explained above.

In the example embodiments herein including the lamp assembly 100 of FIG. 1 and the method 300 of FIG. 3, the controller 102 does not detect power being applied or disconnected. Instead, the controller 102 only operates as described when power is received. For example, the controller 102 automatically modifies (e.g., increments, etc.) one or both variables 116, 118 (if conditions are applicable) and initiates the timer 120 when power is received. Should power be removed to the controller 102, the controller 102 simply deactivates (e.g., stops, etc.) the timer 120 and does not issue any instruction.

As used herein, operating parameters of LEDs may represent controllable output characteristics of the LEDs. For example, the operating parameters may represent light color, light intensity (e.g., brightness, etc.), etc. Further, the operating parameters may represent operating modes such as light activation modes (e.g., continuous, strobe, etc., modes), light activation timing (e.g., when to activate, etc.), frequency of light activation (e.g., the speed in which the LEDs turn on and off, etc.), selective activation of some LEDs over other LEDs (e.g., to control beam pattern, directionality, etc.), etc. If the LEDs herein are employed in a vehicle, such control of the operating parameters of the LEDs may allow for the selection of the above-mentioned dynamic lighting effects with respect to daytime running lights, main beams, dome lights, light bars, turn signals, etc. In such examples, the operating parameters may include characteristics such as a speed and style of a sequential turn signal animation feature, a speed and style of a welcome or activation lighting animation, and the behavior of one or more LEDs when certain inputs are applied, such as the behavior of the LED(s) when an automatic high-beam or an auxiliary lighting function is enabled and the behavior of the LED(s) during activation based on, for example, a travel speed, a steering angle, a vehicle angle, the connection of another LED to the same circuit, etc.

In view of the above, the lamp assemblies and methods herein enable controllers (e.g., microcontrollers, etc.) to be in a programming mode and modify operating parameters of one or more LEDs while receiving primary power from a power source. More specifically, the controllers are configured to perform necessary functions for modifying LED operating parameters (e.g., modifying a programming variable, modifying an operating variable, etc.) while receiving power from the same power source over one or more power cycles and without the reliance on temporary or secondary power sources. As such, existing electrical signals used to power a lamp assembly may also be used to communicate with the lamp assembly and program (e.g., digitally, etc.) and various settings of that lamp assembly. Further, because constant power is not required for successful programming of the controller and modification of the LED operating parameter, a single electrical circuit including a power conductor and a ground conductor may be employed.

Additionally, the functions performed by the controllers herein for modifying an LED operating parameter are reliable with respect to effectiveness and timing, particularly when compared to conventional methods. For example, programming cycles for modifying LED operating parameters may be reliable because the programming cycles occur while receiving power from the primary power source over one or more power cycles. Due to this reliability, multiple LEDs with controllers can be connected in parallel on a single circuit and successfully programmed at the same time, and modification operations to achieve a desired parameter may be largely (and sometimes completely) error free.

It should be appreciated that the functions described herein, in some embodiments, may be described in computer executable instructions stored on a computer readable media, and executable by one or more processors. The computer readable media is a non-transitory computer readable storage medium. The computer readable media and one or more processors may be components of one of the controllers herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lamp assembly for controlling one or more operating parameters of at least one controllable light source, the lamp assembly comprising:

at least one controllable light source configured to receive power from a primary power source; and a controller coupled to the at least one controllable light source, the controller including a storage medium configured to store a programming variable and an operating variable, the controller configured to provide a control signal to the at least one controllable light source consistent with a value of the operating variable, the controller, in response to receiving power from the primary power source during a power cycle, configured to:

activate a timer;

determine whether a value of the programming variable stored in the storage medium is equal to a defined value;

when the value of the programming variable is not equal to the defined value and power from the primary power source is removed within a defined period of time, modify the value of the programming variable stored in the storage medium; and when the value of the programming variable is equal to the defined value, modify the value of the operating variable stored in the storage medium.

2. The lamp assembly of claim 1, wherein the controller is configured to modify the value of the programming variable by incrementing the value of the programming variable, and modify the value of the operating variable by incrementing the value of the operating variable.

3. The lamp assembly of claim 1, wherein the one or more operating parameters include at least one of a color, an intensity level, a beam pattern, and an operating mode of the at least one controllable light source.

4. The lamp assembly of claim 3, wherein the operating variable includes a first value and a second value different than the first value, and wherein the first value corresponds to a first color of the at least one controllable light source and the second value corresponds to a second color of the at least one controllable light source different than the first color.

5. The lamp assembly of claim 1, wherein the controller is configured to modify the value of the operating variable when the value of the programming variable is equal to the defined value for each of a defined number of power cycles.

6. The lamp assembly of claim 1, wherein the controller is configured to reset the value of the programming variable to a default value in response to receiving power from the primary power source for more than the defined period of time.

7. The lamp assembly of claim 1, wherein the at least one controllable light source includes one or more LEDs.

8. A method for controlling one or more operating parameters of at least one controllable light source coupled to a controller having a storage medium, the method comprising:

determining whether the controller is in a programming mode based on a value of a programming variable stored in the storage medium when the controller receives primary power during a power cycle;

in response to determining the controller is in the programming mode, modifying a value of an operating variable stored in the storage medium when the controller receives primary power during the power cycle; and wherein modifying the value of the operating variable includes modifying the value of the operating variable when the controller is in the programming mode for each of a defined number of power cycles.

9. The method of claim 8, wherein the controller is in the programming mode when the value of the programming variable is equal to a defined value.

10. A method for controlling one or more operating parameters of at least one controllable light source coupled to a controller having a storage medium, the method comprising:

determining whether the controller is in a programming mode based on a value of a programming variable stored in the storage medium when the controller receives primary power during a first power cycle;

in response to determining the controller is not in the programming mode, modifying the value of the programming variable; and then determining whether the controller is in the programming mode based on the value of the programming variable stored in the storage medium when the controller receives primary power during a second power cycle; and in response to determining the controller is in the programming mode, modifying a value of an operating variable stored in the storage medium when the controller receives primary power during the power cycle.

11. The method of claim 10, further comprising activating a timer in response to the controller receiving primary power, and resetting the value of the programming variable to a default value in response to the controller receiving primary power for more than a defined period of time.

12. The method of claim 10, wherein modifying the value of the programming variable includes incrementing the value of the programming variable.

13. The method of claim 10, wherein the controller is determined to be in the programming mode when the value of the programming variable is equal to a defined value.

14. A lamp assembly for controlling one or more operating parameters of at least one controllable light source, the lamp assembly comprising:

at least one controllable light source; and a controller coupled to the at least one controllable light source, the controller configured to control an operating parameter of the at least one controllable light source, the controller including a storage medium configured to store a programming variable and an operating variable, the controller, in response to receiving primary power from a power source during a power cycle, configured to:

determine whether the controller is in a programming mode based on a value of the programming variable;

in response to determining the controller is in the programming mode, modify a value of the operating variable by incrementing the value of the operating variable; and reset the value of the programming variable when the controller receives primary power from the power source for more than a defined period of time.

15. The lamp assembly of claim 14, wherein the controller is in the programming mode when the value of the programming variable is equal to a defined value.

16. The lamp assembly of claim 14, wherein the controller is configured to modify the value of the programming variable in response to determining the controller is not in the programming mode.

17. The lamp assembly of claim 16, wherein the controller is configured to modify the value of the programming variable by incrementing the value of the programming variable.

18. The lamp assembly of claim 14, wherein the controller is configured to modify the value of the operating variable when the controller is in the programming mode for each of a defined number of power cycles.

19. A system comprising a vehicle and the lamp assembly of claim 14 coupled to the vehicle.

* * * * *